(12) United States Patent
Yamamoto

(10) Patent No.: US 6,317,269 B1
(45) Date of Patent: Nov. 13, 2001

(54) PROJECTION LENS AND PROJECTOR APPARATUS

(75) Inventor: Chikara Yamamoto, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/711,937

(22) Filed: Nov. 15, 2000

(30) Foreign Application Priority Data

Dec. 10, 1999 (JP) .................................................. 11-351693

(51) Int. Cl.$^7$ ............................... G02B 3/00; G02B 15/14
(52) U.S. Cl. .......................... 359/651; 359/649; 359/682; 359/689
(58) Field of Search ..................................... 359/649–651, 359/682, 689

(56) References Cited

U.S. PATENT DOCUMENTS

| | | | | |
|---|---|---|---|---|
| 5,949,589 | * | 9/1999 | Nakazawa | 359/753 |
| 5,973,848 | * | 10/1999 | Taguchi et al. | 359/651 |
| 6,084,719 | * | 7/2000 | Sugawara et al. | 359/651 |
| 6,137,638 | * | 10/2000 | Yamagishi et al. | 359/682 |
| 6,169,636 | * | 1/2001 | Kreitzer | 359/691 |
| 6,188,522 | * | 2/2001 | Kimura et al. | 359/649 |

FOREIGN PATENT DOCUMENTS

| | | | |
|---|---|---|---|
| 9-85921 | 3/1997 | (JP) . | |
| 10-260346 | 9/1998 | (JP) . | |
| 5-27174 | * | 2/1993 | (JP) ...................................... 359/689 |

* cited by examiner

*Primary Examiner*—Evelyn A Lester
(74) *Attorney, Agent, or Firm*—Snider & Associates; Ronald R. Snider

(57) ABSTRACT

A projection lens comprises, successively from the enlargement side, a first lens group having a negative refracting power, a second lens group having a positive refracting power, and a third lens group having a positive refracting power. A lens part disposed closest to the reduction end in the first lens group is moved on the optical axis so as to carry out a focus adjustment. The projection lens satisfies $0.8<D_{G12}/f<3.0$, where $D_{G12}$ is the distance between the first and second lens groups, and f is the focal length of the whole system.

7 Claims, 6 Drawing Sheets

EXAMPLE 1

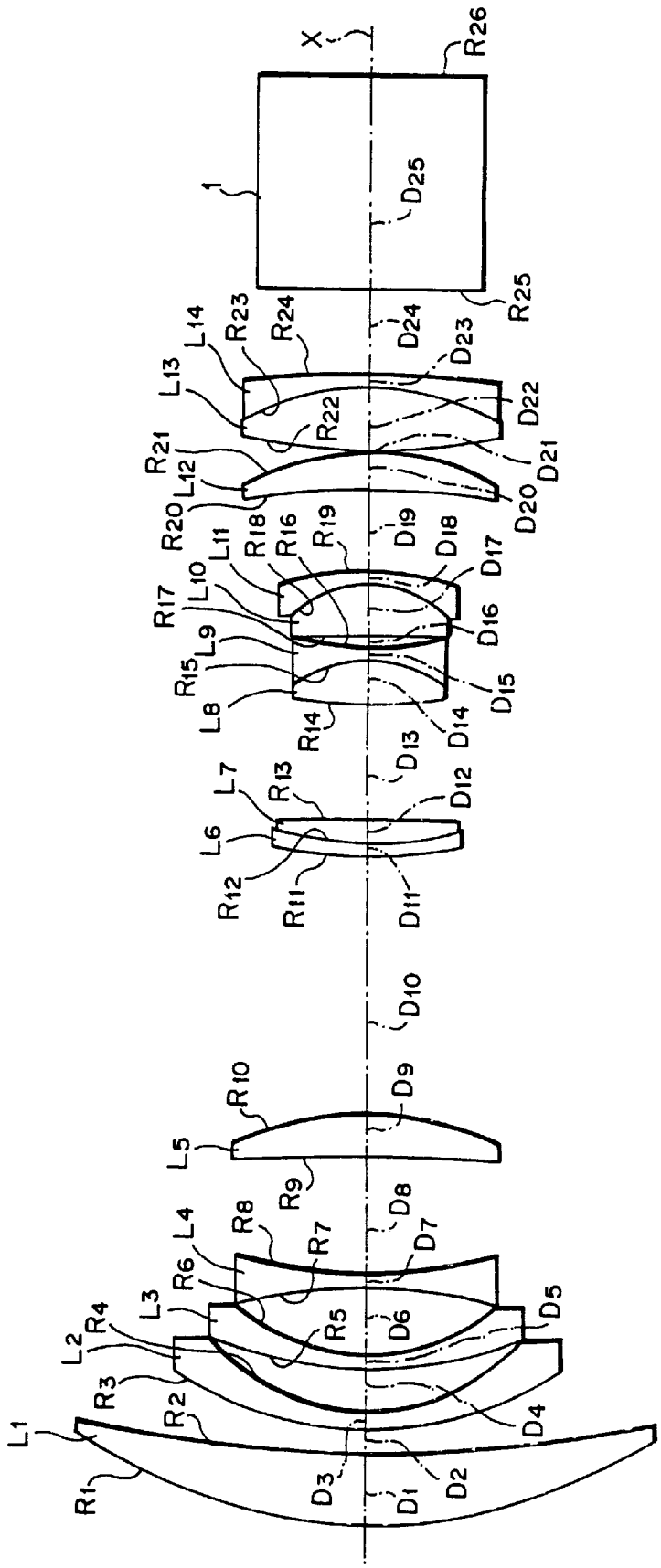
F I G. 1
EXAMPLE 1

EXAMPLE 2

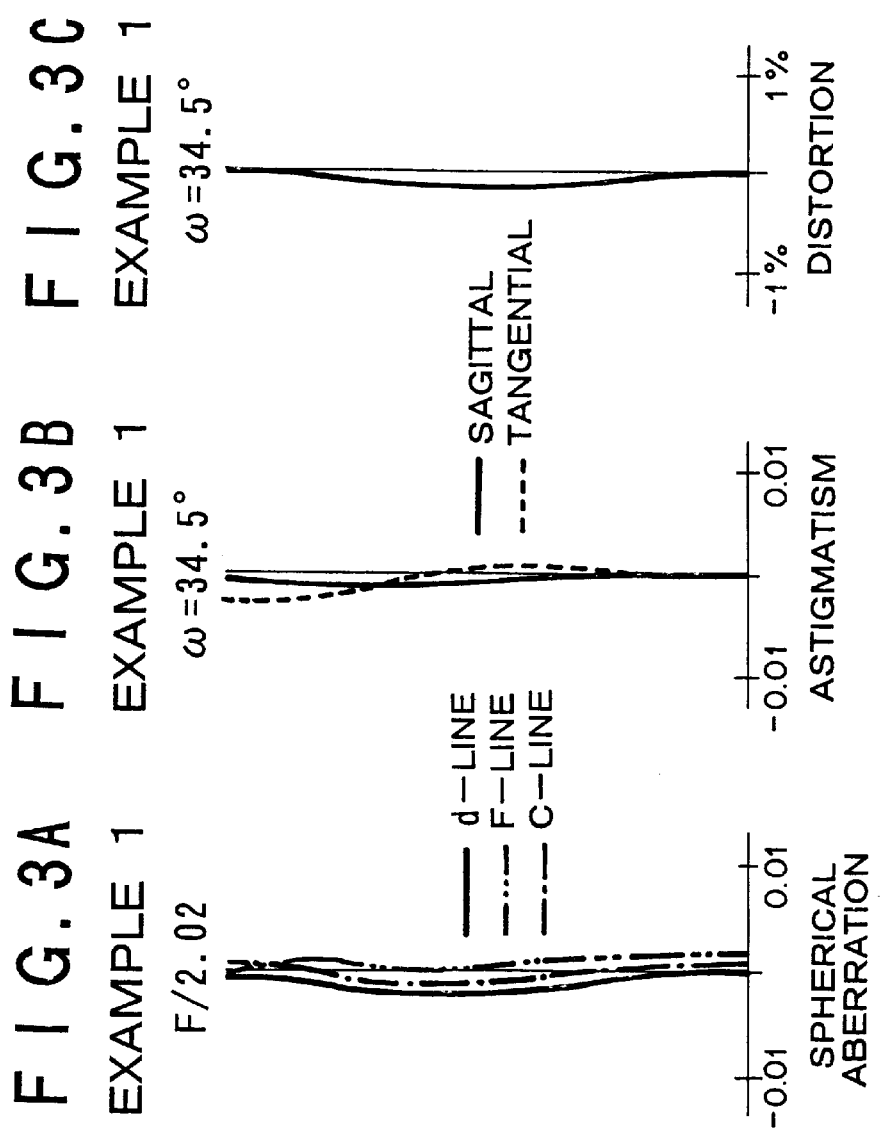

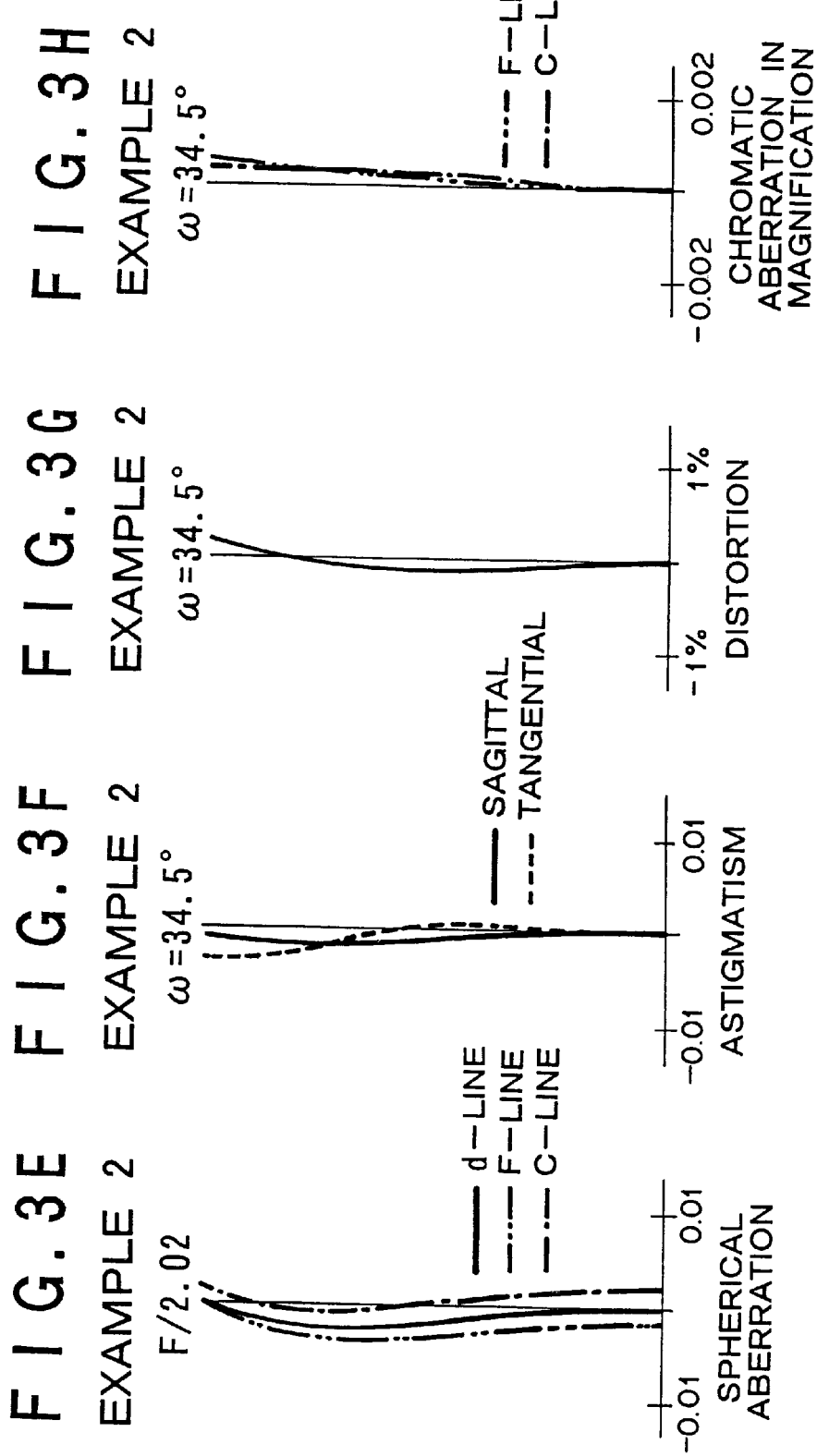

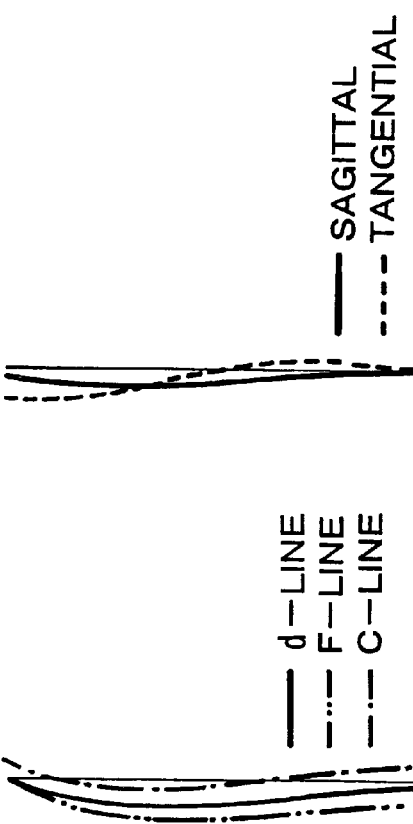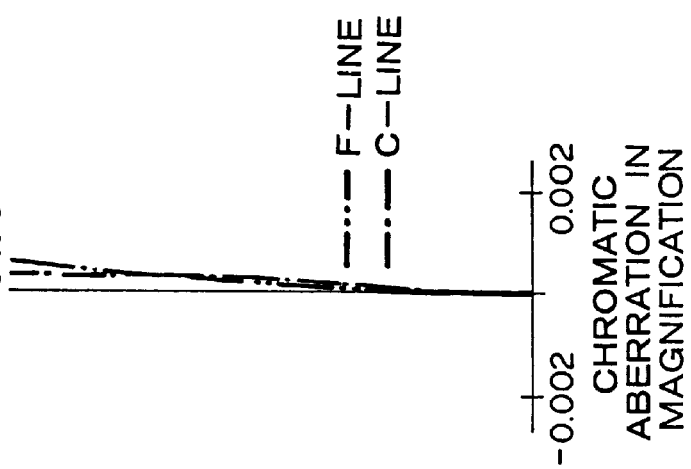

PROJECTION LENS AND PROJECTOR APPARATUS

RELATED APPLICATIONS

This application claims the priority of Japanese Patent Application No. 11-351693 filed on Dec. 10, 1999, which is incorporated herein by reference.

BACKGROUND OF THE INVENTION

1. Field of the Invention

The present invention relates to a projection lens; and, in particular, to a projection lens used for a color liquid-crystal type projector which combines a plurality of images having color information items different from each other and then projects thus obtained composite image onto a screen surface under magnification, and a projector apparatus.

2. Description of the Prior Art

There have conventionally been proposed various kinds of color liquid-crystal type projectors adapted to optically superpose images displayed on a plurality of liquid-crystal displays (liquid-crystal light valves) and project thus obtained composite image onto a screen surface through a projection lens.

Here, an example of color liquid-crystal type projector will be explained with reference to FIG. 4.

As shown in FIG. 4, this color liquid-crystal type video projector comprises a light source 100; a pair of lens arrays 3A, 3B; first and second dichroic mirrors 5, 6 for separating the light from the light source into three primary colors; a condenser lens 4; first, second, third, and fourth total reflection mirrors 12, 14, 17, 18; three liquid-crystal display panels 7 (for red light), 8 (for green light), and 9 (for blue light); and a dichroic prism 10 for combining the three primary color light components; whereas a projection lens 11 is disposed on the exit side of the dichroic prism 10.

The light source 100 is a high-luminance white light source such as halogen lamp, metal halide lamp, or the like.

The first dichroic mirror 5 is a mirror for reflecting red light, whereas the second dichroic mirror 6 is a mirror for reflecting green light. Each of them comprises a glass substrate and a dichroic film provided thereon which is constituted by a dielectric multilayer film having such a spectral characteristic that it reflects a predetermined primary color light component as a mirror.

Each of the three liquid-crystal display panels 7, 8, 9 comprises a liquid-crystal display device of a twisted nematic type (TN type, STN type, of TFT type) or the like, and displays an image in response to its corresponding liquid-crystal signal from a liquid-crystal driver which is not shown, thereby modulating the respective incident primary color light component in terms of luminance.

The dichroic prism 10 is constituted by four rectangular prisms which are cemented together. Its two cemented planes orthogonal to each other are provided with respective dichroic films having spectral characteristics as a red-light-reflecting mirror and a blue-light-reflecting mirror, whereby three primary color light components of red, green, and blue can be combined into a single luminous flux.

A field lens 20 and a relay lens 21 are disposed in a system for blue light, whereas field lenses 15, 16, 19 are disposed in front of the liquid-crystal display panels 7, 8, 9, respectively.

The projection lens 11 employed in thus configured color liquid-crystal type video projector is configured so as to be able to project the combined three primary color light components onto a screen disposed at a predetermined distance, such that a full-color image is projected on this screen under magnification.

The following properties are required for this projection lens 11.

First, since light beams are combined by the cross dichroic prism 10, the projection lens 11 is required to have a low chromatic aberration, a long back focus, and a telecentricity. Also, for yielding a large projection image at a short projection length, the projection lens 11 is required to have a wider angle. Further, for projecting the quadrangular liquid-crystal display panels 7, 8, 9 without distortion, the projection lens 11 is required to reduce its distortion.

Thus, for projection lenses using liquid-crystal display panels as such, an optical system having a telecentricity in relation to the liquid-crystal display panels or illumination systems and a long back focus necessary for inserting the color-combining optical system and the like have been in demand (see Japanese Unexamined Patent Publication No. 10-260346, for example). On the other hand, as color liquid-crystal type projectors have been attaining higher resolution and higher luminance recently, there have been demands for developing bright projection lenses having high performances.

As a projection lens attains a higher resolution and a higher brightness, however, the lens inevitably becomes larger, whereby the mechanism for moving the lens group upon a focus adjustment also becomes larger.

In the field of imaging lenses for single-lens reflex cameras and video cameras, an inner focus type in which only a part of lenses in a lens group is made movable so as to realize a simple focus adjustment has been known. If this inner focus type is applied to the projection lens as it is, however, the exit angle will be so acute that telecentricity may not be obtained.

Thus, when such an inner focus type lens is employed in a color liquid-crystal type projector, there is a problem that color unevenness may occur on the screen when combining colors in the cross dichroic prism 10. Therefore, it is difficult for a conventional inner focus type lens to be used as the projection lens in a color liquid-crystal type video projector as it is.

Also, while a long back focus has been demanded in order to insert a color-combining optical system and the like, the system as a whole becomes larger if the back focus is too long, whereby the lens diameter on the reduction side may increase.

SUMMARY OF THE INVENTION

In view of the circumstances mentioned above, it is an object of the present invention to provide a compact projection lens having an appropriate back focus adapted to insert a color-combining optical system therein but not longer than necessary, favorable optical performances with low distortion and chromatic aberration, and a simple inner focus structure; and a projector apparatus using the same.

The present invention provides a projection lens comprising, successively from an enlargement side, a first lens group having a negative refracting power, a second lens group having a positive refracting power, and a third lens group having a positive refracting power; a lens part disposed closest to a reduction end in the first lens group being moved on an optical axis so as to carry out a focus adjustment; the projection lens satisfying the following conditional expression (1):

$$0.8 < D_{G12}/f < 3.0 \qquad (1)$$

where $D_{G12}$ is the distance between the first and second lens groups, and f is the focal length of the whole system.

Preferably, the projection lens satisfies the following conditional expressions (2) and (3);

$$-6.0 < f_1/f < -1.5 \quad (2)$$

$$1.5 < f_{23}/f < 4.0 \quad (3)$$

where $f_1$ is the focal length of the first lens group, and $f_{23}$ is the composite focal length of the second and third lens groups.

Preferably, the lens part disposed closest to the reduction end in the first lens group is constituted by a positive single lens having a convex surface directed onto the reduction side.

Preferably, the projection lens satisfies the following conditional expressions (4) and (5):

$$|f/IM_{12}| < 0.125 \quad (4)$$

$$1.0 < f_3/f < 3.5 \quad (5)$$

where $IM_{12}$ is the reduction-side image point position caused by the first and second lens groups, and $f_3$ is the focal length of the third lens group.

Preferably, the second lens group comprises three cemented lenses.

Preferably, the third lens group comprises, successively from the enlargement side, a positive lens having a convex surface directed onto the reduction side, and a cemented lens composed of a positive lens and a negative lens.

Here, the above-mentioned lens part refers to not only a single lens but also two or more lenses.

The projector apparatus of the present invention comprises the projection lens mentioned above.

BRIEF DESCRIPTION OF THE DRAWINGS

FIG. 1 is a sectional view showing the projection lens in accordance with Example 1 of the present invention;

FIGS. 3A to 3L are aberration charts showing various kinds of aberration of the projection lenses in accordance with Examples 1 to 3 of the present invention at a power of 0.013.

DESCRIPTION OF THE PREFERRED EMBODIMENTS

In the following, an embodiment of the present invention will be explained with reference to the drawings.

Figure 2:
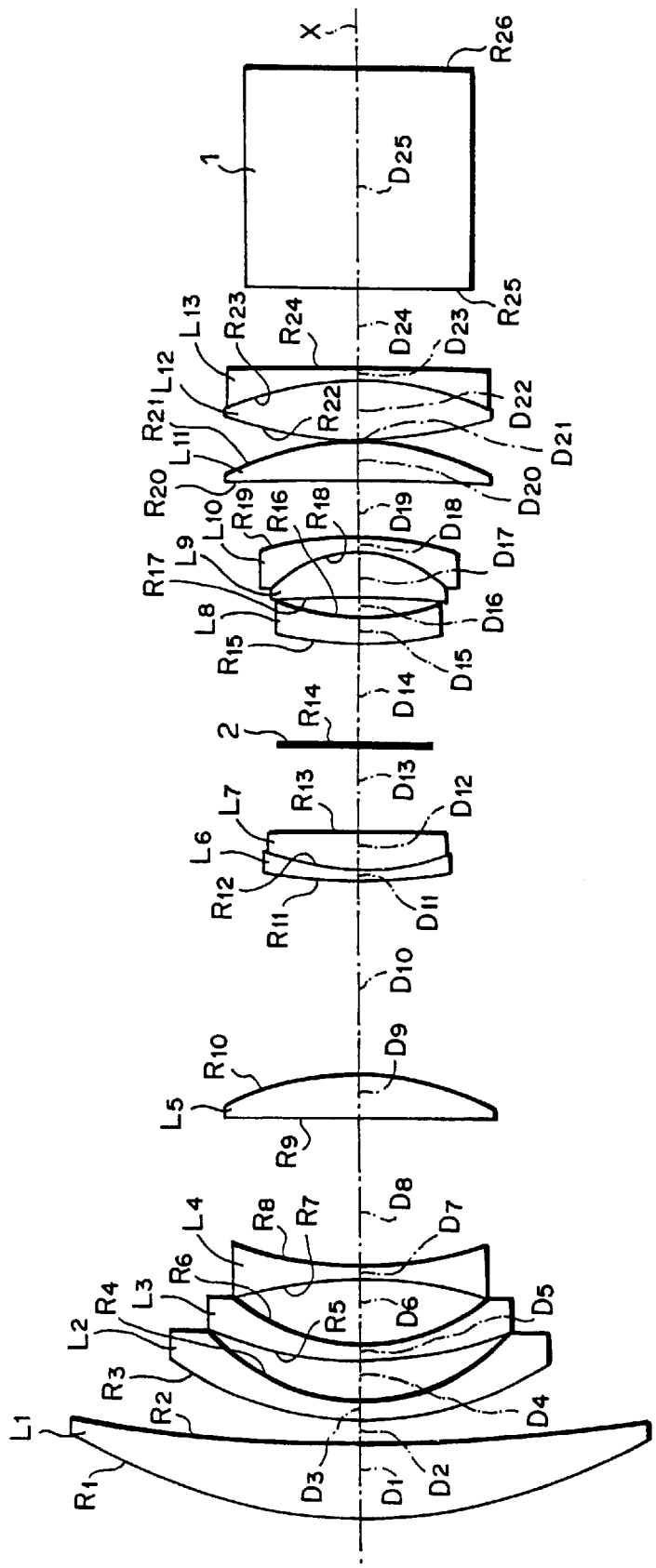
FIG. 2 is a sectional view showing the projection lens in accordance with Example 2 of the present invention.
Figure 4:
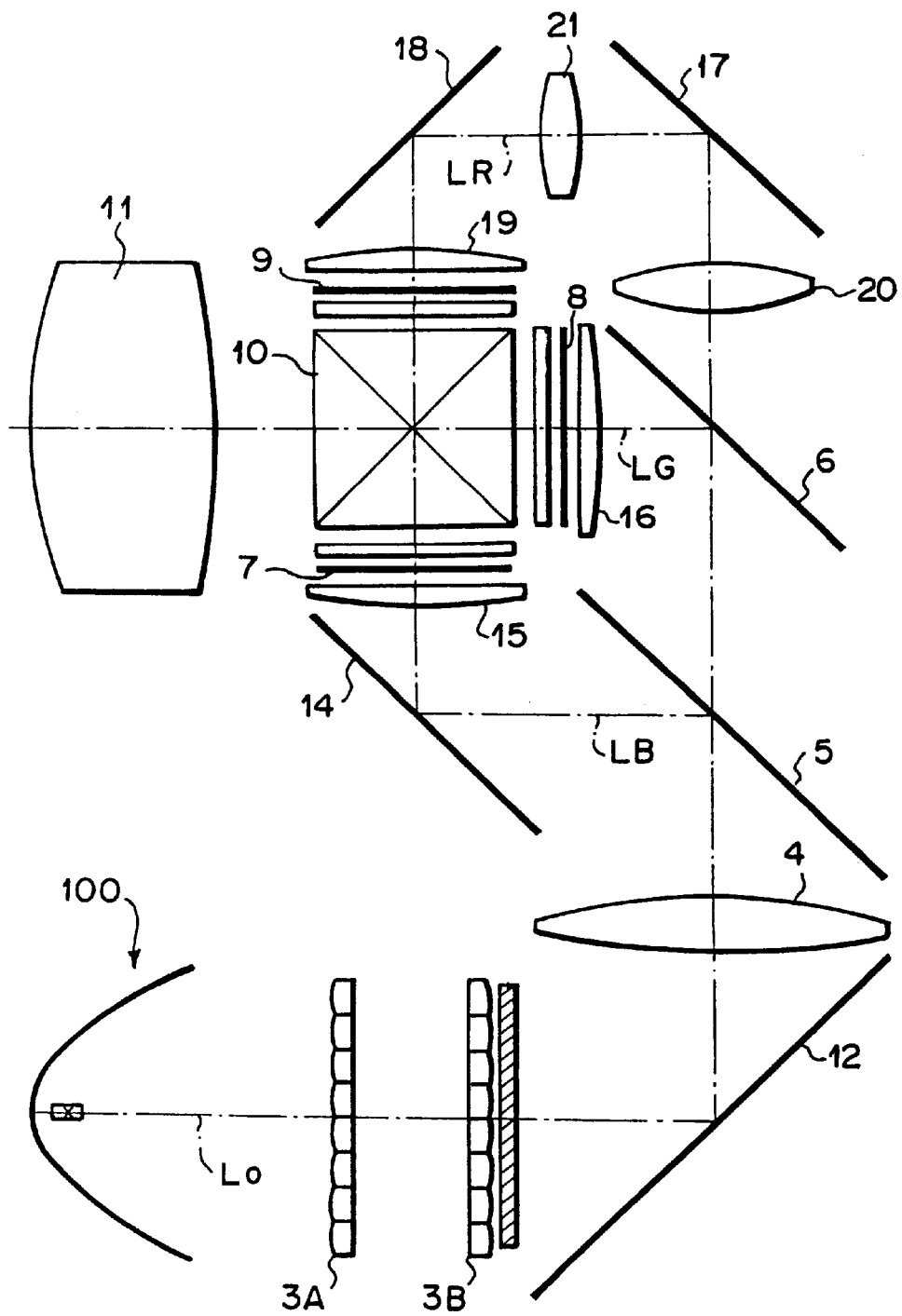
FIG. 4 is a view showing an example of color liquid-crystal type projector equipped with a projection lens.

FIG. 1 shows the configuration of Example 1 (which is substantially the same as Example 3), whereas FIG. 2 shows the configuration of Example 2.

As shown in FIGS. 1 and 2, the projection lens in accordance with an example of the present invention has a configuration composed of 14 lenses (13 lenses in Example 2) comprising, successively from the enlargement side, a first lens group $G_1$ having a negative refracting power, a second lens group $G_2$ having a positive refracting power, and a third lens group $G_3$ having a positive refracting power. The fifth lens $L_5$ is movable on an optical axis X. A focus adjustment is carried out when the fifth lens $L_5$ is moved on the optical axis X. Further, a filter block (color-combining prism) 1 is disposed on the reduction side of the whole system.

Such a lens configuration yields a long back focus and a telecentricity, and improves distortion and chromatic aberration.

Since the fifth lens $L_5$ disposed closest to the reduction end in the first lens group $G_1$ is moved on the optical axis X so as to carry out a focus adjustment, the lens barrel reduces its diameter, and the apparatus structure becomes simple and compact.

The projection lens is configured so as to satisfy the following conditional expression (1):

$$0.8 < D_{G12}/f < 3.0 \quad (1)$$

where $D_{G12}$ is the distance between the first lens group $G_1$ and second lens group $G_2$, and f is the focal length of the whole system.

If the value of $D_{G12}/f$ exceeds the upper limit in the above-mentioned conditional expression (1), then the whole system becomes too large or elongates its back focus too much, whereby the lens diameter on the reduction side becomes too large.

If the value of $D_{G12}/f$ is less than the lower limit, then the back focus becomes too short, whereby a color-combining optical system is hard to insert therein, or aberration is harder to correct in bright lenses. Thus, by satisfying the above-mentioned conditional expression (1), the projection lens has an appropriate back focus adapted to insert a color-combining optical system therein but not longer than necessary, a telecentricity, and favorable optical performances with low distortion and chromatic aberration.

Also, the projection lens is configured so as to satisfy the following conditional expressions (2) and (3):

$$-6.0 < f_1/f < -1.5 \quad (2)$$

$$1.5 < f_{23}/f < 4.0 \quad (3)$$

where $f_1$ is the focal length of the first lens group $G_1$, and $f_{23}$ is the composite focal length of the second lens group $G_2$ and third lens group $G_3$.

If the value of $f_1/f$ or $f_{23}/f$ is above the upper limit or below the lower limit in its corresponding conditional expression (2) or (3), the balance between the first lens group $G_1$ and the second lens group $G_2$ or third lens group $G_3$ may deteriorate, whereby it becomes harder to attain an appropriate back focus or correct various kinds of aberration. Therefore, by satisfying the above-mentioned conditional expressions (2) and (3), the projection lens attains a favorable balance between the first lens group $G_1$ and the second lens group $G_2$ and third lens group $G_3$, thereby yielding an appropriate back focus, thus making it easier to correct various kinds of aberration.

The focus lens $L_5$ disposed closest to the reduction end in the first lens group $G_1$ is constituted by a positive single lens having a convex surface directed onto the reduction side. When the focus lens $L_5$ is constituted by a single lens as such, the system can be made compact, which can lower the burden on a motor or the like when reducing the weight of focus-moving group so as to attain an electric motor-driven focus, whereby the cost can be cut down.

Also, the projection lens is configured so as to satisfy the following conditional expressions (4) and (5):

$$|f/IM_{12}| < 0.125 \quad (4)$$

$$1.0 < f_3/f < 3.5 \quad (5)$$

where $IM_{12}$ is the reduction-side image point position caused by the first lens group $G_1$ and second lens group $G_2$, and $f_3$ is the focal length of the third lens group $G_3$.

In the above-mentioned conditional expressions (4) and (5), if the value of $|f/IM_{12}|$ or $f_3/f$ exceeds its upper limit or if the value of $f_3/f$ is less than its lower limit, then it becomes harder to construct a telecentric optical system on the reduction side while attaining an appropriate back focus. As a consequence, the whole system becomes larger, or a color-combining optical system and the like cannot be inserted therein, and color unevenness may occur on the screen due to the deterioration of telecentricity. Therefore, by satisfying the above-mentioned conditional expressions (4) and (5), the projection lens constructs a favorable optical system having a telecentricity on the reduction side while attaining an appropriate back focus in which a color-combining optical system and the like can be inserted, prevents colors from becoming uneven on the screen, and achieves compactness in the whole system.

The second lens group $G_2$ comprises, successively from the enlargement side, a cemented lens composed of a negative lens $L_6$ and a positive lens $L_7$, a cemented lens composed of a convex lens $L_8$ and a concave lens $L_9$ (a stop $R_{14}$ and a negative lens $L_8$ having a convex surface directed onto the enlargement side in Example 2), and a cemented lens composed of a positive lens $L_{10}$ and a negative lens $L_{11}$ (a positive lens $L_9$ and a negative lens $L_{10}$ in Example 2).

The third lens group $G_3$ comprises, successively from the enlargement side, a positive lens $L_{12}$ (a positive lens $L_{11}$ in Example 2) having a convex surface directed onto the reduction side, and a cemented lens composed of a positive lens $L_{13}$ and a negative lens $L_{14}$ (a positive lens $L_{12}$ and a negative lens $L_{13}$ in Example 2).

As the third lens group $G_3$ is provided with a cemented lens, the chromatic dispersion in magnification peculiar to wide lenses can be corrected.

In the following, the above-mentioned Examples 1 to 3 will be explained with reference to specific values.

EXAMPLE 1

The projection lens in accordance with Example 1 of the present invention will be explained with reference to FIG. 1.

In Example 1, the first lens group $G_1$ comprises, successively from the enlargement side, a positive meniscus lens $L_1$ having a convex surface directed onto the enlargement side, negative meniscus lenses $L_2$, $L_3$ each having a convex surface directed onto the enlargement side, a biconcave lens $L_4$ having a surface with a stronger curvature directed onto the enlargement side, and a positive meniscus lens $L_5$ having a convex surface directed onto the reduction side.

The second lens group $G_2$ comprises, successively from the enlargement side, a cemented lens composed of a negative meniscus lens $L_6$ having a convex surface directed onto the enlargement side and a biconvex lens $L_7$ having a surface with a stronger curvature directed onto the enlargement side, a cemented lens composed of a biconvex lens $L_8$ having a surface with a stronger curvature directed onto the reduction side and a biconcave lens $L_9$ having a surface with a stronger curvature directed onto the enlargement side, and a cemented lens composed of a positive meniscus lens $L_{10}$ having a convex surface directed onto the reduction side and a negative meniscus lens $L_{11}$ having a convex surface directed onto the reduction side.

The third lens group $G_3$ comprises, successively from the enlargement side, a positive meniscus lens $L_{12}$ having a convex surface directed onto the reduction side, and a cemented lens composed of a biconvex lens $L_{13}$ having a surface with a stronger curvature directed onto the reduction side and a negative meniscus lens $L_{14}$ having a convex surface directed onto the reduction side.

Letting $D_{G12}$ be the distance between the first lens group $G_1$ and second lens group $G_2$, and f be the focal length of the whole system, $D_{G12}/f$ is set so as to become 2.06 as shown in Table 4 which will be mentioned later. As a consequence, the above-mentioned conditional expression (1) is satisfied.

Also, letting $f_1$ be the focal length of the first lens group $G_1$, and $f_{23}$ be the composite focal length of the second lens group $G_2$ and third lens group $G_3$, $f_1/f$ and $f_{23}/f$ are set so as to become −2.70 and 2.91, respectively, as shown in Table 4 which will be mentioned later. As a consequence, the above-mentioned conditional expressions (2) and (3) are satisfied.

Further, letting $IM_{12}$ be the reduction-side image point position caused by the first lens group $G_1$ and second lens group $G_2$, and $f_3$ be the focal length of the third lens group $G_3$, $|f/IM_{12}|$ and $f_3/f$ are set so as to become $3.00 \times 10^{-4}$ and 2.12, respectively, as shown in Table 4 which will be mentioned later. As a consequence, the above-mentioned conditional expressions (4) and (5) are satisfied.

Table 1 (follows) shows the radius of curvature R of each lens surface, the center thickness of each lens and air space between each pair of lenses D, and the refractive index N and Abbe number ν of each lens at d-line in the projection lens in accordance with Example 1. The lower part of Table 1 shows the respective spaces of D8 and D10 at a power of 0.013.

In Table 1 and its subsequent Tables 2 and 3, numbers referring to each of letters R, D, N, and ν successively increase from the enlargement side.

FIGS. 3A to 3D show spherical aberration, astigmatism, distortion, and chromatic aberration in magnification concerning Example 1, respectively.

It is seen from these aberration charts that the projection lens in accordance with Example 1 maintains favorable optical performances.

EXAMPLE 2

The projection lens in accordance with Example 2 of the present invention will be explained with reference to FIG. 2.

As shown in FIG. 2, the projection lens in accordance with Example 2 has a lens configuration composed of 13 lenses, the number of which is smaller by 1 than the number of lenses in the projection lens in accordance with Example 1. This projection lens differs from that of Example 1 mainly in that the fifth lens $L_5$ disposed closest to the reduction end in the first lens group $G_1$ is a biconvex lens having a surface with a stronger curvature directed onto the reduction side, that the seventh lens $L_7$ forming a cemented lens together with the sixth lens $L_6$ disposed closest to the enlargement end in the second lens group $G_2$ is a plano-convex lens, that a stop 2 is disposed between the seventh lens $L_7$ and eighth lens $L_8$, and that the eighth lens $L_8$ is a negative meniscus lens having a convex surface directed onto the enlargement side.

Letting $D_{G12}$ be the distance between the first lens group $G_1$ and second lens group $G_2$, and f be the focal length of the whole system, $D_{G12}/f$ is set so as to become 1.54 as shown in Table 4 which will be mentioned later. As a consequence, the above-mentioned conditional expression (1) is satisfied.

Also, letting $f_1$ be the focal length of the first lens group $G_1$, and $f_{23}$ be the composite focal length of the second lens group $G_2$ and third lens group $G_3$, $f_1/f$ and $f_{23}/f$ are set so as to become −3.58 and 2.86, respectively, as shown in Table 4 which will be mentioned later. As a consequence, the above-mentioned conditional expressions (2) and (3) are satisfied.

Further, letting $IM_{12}$ be the reduction-side image point position caused by the first lens group $G_1$ and second lens group $G_2$, and $f_3$ be the focal length of the third lens group $G_3$, $|f/IM_{12}|$ and $f_3/f$ are set so as to become $6.49 \times 10^{-2}$ and 1.90, respectively, as shown in Table 4 which will be mentioned later. As a consequence, the above-mentioned conditional expressions (4) and (5) are satisfied.

Table 2 shows the radius of curvature R of each lens surface, the center thickness of each lens and air space between each pair of lenses D, and the refractive index N and Abbe number v of each lens at d-line in the projection lens in accordance with Example 2. The lower part of Table 2 shows the respective spaces of D8 and D10 at a power of 0.013.

FIGS. 3E to 3H show spherical aberration, astigmatism, distortion, and chromatic aberration in magnification concerning Example 2, respectively.

It is seen from these aberration charts that the projection lens in accordance with Example 2 maintains favorable optical performances.

EXAMPLE 3

The projection lens in accordance with Example 3 of the present invention will now be explained.

While the projection lens in accordance with Example 3 has a 14-lens configuration substantially the same as that of the projection lens in accordance with Example 1, it differs therefrom mainly in that the seventh lens $L_7$ constituting a cemented lens together with the sixth lens $L_6$ disposed closest to the enlargement end in the second lens group $G_2$ is a positive meniscus lens having a convex surface directed onto the object side.

Letting $DG_{12}$ be the distance between the first lens group $G_1$ and second lens group $G_2$, and f be the focal length of the whole system, $D_{G12}/f$ is set so as to become 1.86 as shown in Table 4 which will be mentioned later. As a consequence, the above-mentioned conditional expression (1) is satisfied.

Also, letting $f_1$ be the focal length of the first lens group $G_1$, and $f_{23}$ be the composite focal length of the second lens group $G_2$ and third lens group $G_3$, $f_1/f$ and $f_{23}/f$ are set so as to become −2.64 and 2.85, respectively, as shown in Table 4 which will be mentioned later. As a consequence, the above-mentioned conditional expressions (2) and (3) are satisfied.

Further, letting $IM_{12}$ be the reduction-side image point position caused by the first lens group $G_1$ and second lens group $G_2$, and $f_3$ be the focal length of the third lens group $G_3$, $|f/IM_{12}|$ and $f_3/f$ are set so as to become $1.19 \times 10^{-4}$ and 2.16, respectively, as shown in Table 4 which will be mentioned later. As a consequence, the above-mentioned conditional expressions (4) and (5) are satisfied.

Table 3 shows the radius of curvature R of each lens surface, the center thickness of each lens and air space between each pair of lenses D, and the refractive index N and Abbe number v of each lens at d-line in the projection lens in accordance with Example 3. The lower part of Table 3 shows the respective spaces of D8 and D10 at a power of 0.013.

FIGS. 3I to 3L show spherical aberration, astigmatism, distortion, and chromatic aberration in magnification concerning Example 3, respectively.

It is seen from these aberration charts that the projection lens in accordance with Example 3 maintains favorable optical performances.

The projection lens in accordance with the present invention is usable not only in color liquid-crystal type projectors, but also in color projectors using a digital micromirror device (DMD), or as an imaging lens employed in imaging devices such as CCD and image pickup tube, and cameras using a silver halide film.

In the projection lens and projector apparatus of the present invention, as explained in the foregoing, the lens disposed closest to the reduction end in the first lens group is moved on the optical axis X, so as to carry out a focus adjustment, whereas the conditional expression of $0.8 < D_{G12}/f < 3.0$ is satisfied, where $D_{G12}$ is the distance between the first and second lens groups, and f is the focal distance of the whole system, whereby they can have an appropriate back focus adapted to insert a color-combining optical system therein but not longer than necessary, and favorable optical performances with low distortion and chromatic aberration.

Also, letting $f_1$ be the focal length of the first lens group, and $f_{23}$ be the composite focal length of the second and third lens groups, the conditional expressions of $-6.0 < f_1/f < -1.5$ and $1.5 < f_{23}/f < 4.0$ are satisfied, so that a favorable balance between the first lens group and the second and third lens groups is attained, whereby an appropriate back focus is obtained, which makes it easier to correct various kinds of aberration.

Further, since the focus lens disposed closest to the reduction end in the first lens group is constituted by a positive single lens having a convex surface directed onto the reduction side, the system can be made compact, which can lower the burden on a motor when reducing the weight of focus-moving group so as to attain an electric motor-driven focus, whereby the cost can be cut down.

Also, letting $IM_{12}$ be the reduction-side image point position caused by the first and second lens groups, and $f_3$ be the focal length of the third lens group, conditional expressions of $|f/IM_{12}| < 0.125$ and $1.0 < f3/f < 3.5$ are satisfied, whereby it is possible to construct a favorable optical system having a telecentricity on the reduction side while attaining an appropriate back focus in which a color-combining optical system and the like can be inserted, colors can be prevented from becoming uneven on the screen, and compactness can be achieved in the whole system.

Further, since the third lens comprises, successively from the enlargement side, a positive lens having a convex surface directed onto the reduction side, and a cemented lens composed of a positive lens and a negative lens, the chromatic dispersion in magnification peculiar to wide lenses can be corrected.

TABLE 1

| Surface | R | D | $N_d$ | $v_d$ |
|---|---|---|---|---|
| 1 | 3.7128 | 0.5601 | 1.7923 | 48.8 |
| 2 | 9.5327 | 0.2037 | | |
| 3 | 2.4934 | 0.1630 | 1.7259 | 55.2 |
| 4 | 1.5179 | 0.3291 | | |
| 5 | 2.9417 | 0.1222 | 1.7725 | 49.6 |
| 6 | 1.4286 | 0.5599 | | |
| 7 | −3.3143 | 0.1018 | 1.8467 | 23.9 |
| 8 | 3.3868 | 0.9740 | | |
| 9 | −13.2042 | 0.3361 | 1.5163 | 64.1 |
| 10 | −2.1896 | 2.0555 | | |
| 11 | 3.4063 | 0.0937 | 1.5635 | 43.1 |
| 12 | 2.3421 | 0.1886 | 1.8052 | 25.4 |
| 13 | −198.5832 | 0.9672 | | |
| 14 | 3.9366 | 0.3613 | 1.7283 | 28.5 |
| 15 | −0.9260 | 0.0937 | 1.6889 | 31.1 |
| 16 | 1.7647 | 0.1023 | | |
| 17 | −182.0326 | 0.4086 | 1.4875 | 70.2 |
| 18 | −0.8297 | 0.0937 | 1.8467 | 23.9 |
| 19 | −2.1482 | 0.6652 | | |
| 20 | −5.3824 | 0.2990 | 1.7130 | 53.9 |
| 21 | −1.8421 | 0.0122 | | |
| 22 | 4.5873 | 0.5039 | 1.7489 | 48.3 |
| 23 | −1.7965 | 0.1018 | 1.8467 | 23.9 |
| 24 | −8.1451 | 0.7044 | | |
| 25 | ∞ | 1.7436 | 1.5163 | 64.1 |
| 26 | ∞ | | | |
| Space at × 0.013 | | | | |
| 8 | 1.0034 | | | |
| 10 | 2.0261 | | | |

TABLE 2

| Surface | R | D | $N_d$ | $v_d$ |
|---|---|---|---|---|
| 1 | 3.9684 | 0.6099 | 1.7454 | 53.5 |
| 2 | 11.5330 | 0.2036 | | |
| 3 | 2.4567 | 0.1629 | 1.6437 | 59.3 |
| 4 | 1.5029 | 0.3155 | | |
| 5 | 2.8438 | 0.1221 | 1.7859 | 44.2 |
| 6 | 1.4630 | 0.5410 | | |
| 7 | −3.2741 | 0.1018 | 1.8467 | 23.9 |
| 8 | 2.7837 | 1.1966 | | |
| 9 | 480.4440 | 0.3515 | 1.5163 | 64.1 |
| 10 | −2.1739 | 1.5415 | | |
| 11 | 3.6902 | 0.0936 | 1.8044 | 39.6 |
| 12 | 1.8652 | 0.2997 | 1.8052 | 25.4 |
| 13 | 117.3455 | 0.6992 | | |
| 14 | ∞ | 0.8274 | (stop) | |
| 15 | 2.9072 | 0.2036 | 1.8467 | 23.9 |
| 16 | 1.8875 | 0.1723 | | |
| 17 | −12.7493 | 0.3738 | 1.5182 | 58.9 |
| 18 | −0.9304 | 0.0936 | 1.8201 | 26.2 |
| 19 | −2.6965 | 0.4662 | | |
| 20 | −26.4203 | 0.3255 | 1.7859 | 44.2 |
| 21 | −1.9952 | 0.0122 | | |
| 22 | 3.3440 | 0.4762 | 1.6854 | 51.9 |
| 23 | −2.2395 | 0.1018 | 1.8467 | 23.9 |
| 24 | −47.8082 | 0.6519 | | |
| 25 | ∞ | 1.7426 | 1.5163 | 64.1 |
| 26 | ∞ | | | |

Space at × 0.013

| 8 | 1.2207 |
|---|---|
| 10 | 1.5174 |

TABLE 3

| Surface | R | D | $N_d$ | $v_d$ |
|---|---|---|---|---|
| 1 | 3.7761 | 0.6564 | 1.7432 | 49.3 |
| 2 | 10.8807 | 0.2034 | | |
| 3 | 2.4948 | 0.1627 | 1.6204 | 60.3 |
| 4 | 1.5099 | 0.3157 | | |
| 5 | 2.8442 | 0.1220 | 1.7859 | 44.2 |
| 6 | 1.3871 | 0.5568 | | |
| 7 | −3.2376 | 0.1017 | 1.8467 | 23.9 |
| 8 | 3.2253 | 0.9936 | | |
| 9 | −8.7215 | 0.3552 | 1.5163 | 64.1 |
| 10 | −2.0911 | 1.8569 | | |
| 11 | 3.4010 | 0.0936 | 1.7620 | 40.1 |
| 12 | 2.0452 | 0.1627 | 1.8052 | 25.4 |
| 13 | 38.1392 | 1.0055 | | |
| 14 | 2.7193 | 0.3999 | 1.8052 | 25.4 |
| 15 | −1.0240 | 0.0936 | 1.7552 | 27.5 |
| 16 | 1.7858 | 0.1986 | | |
| 17 | −9.3394 | 0.3382 | 1.4875 | 70.2 |
| 18 | −0.8469 | 0.0936 | 1.8467 | 23.9 |
| 19 | −2.0888 | 0.6869 | | |
| 20 | −9.1991 | 0.2848 | 1.7130 | 53.9 |
| 21 | −1.9180 | 0.0122 | | |
| 22 | 3.6012 | 0.4882 | 1.6485 | 53.0 |
| 23 | −1.8634 | 0.1017 | 1.8467 | 23.9 |
| 24 | −9.5915 | 0.6775 | | |
| 25 | ∞ | 1.7412 | 1.5163 | 64.1 |
| 26 | ∞ | | | |

Space at × 0.013

| 8 | 1.0238 |
|---|---|
| 10 | 1.8267 |

TABLE 4

Values of Expressions

| | Example 1 | Example 2 | Example 3 |
|---|---|---|---|
| A | 2.06 | 1.54 | 1.85 |
| B | −2.70 | −3.58 | −2.64 |
| C | 2.91 | 2.86 | 2.85 |
| D | $3.00 \times 10^{-4}$ | $6.49 \times 10^{-2}$ | $1.19 \times 10^{-4}$ |
| E | 2.12 | 1.90 | 2.16 |

What is claimed is:

1. A projection lens comprising, successively from an enlargement side, a first lens group having a negative refracting power, a second lens group having a positive refracting power, and a third lens group having a positive refracting power;

a lens part disposed closest to a reduction end in said first lens group being moved on an optical axis so as to carry out a focus adjustment; the projection lens satisfying the following conditional expression (1):

$$0.8 < D_{G12}/f < 3.0 \tag{1}$$

where $D_{G12}$ is the distance between said first and second lens groups, and f is the focal length of the whole system.

2. A projection lens according to claim 1, wherein said projection lens satisfies the following conditional expressions (2) and (3);

$$-6.0 < f_1/f < -1.5 \tag{2}$$

$$1.5 < f_{23}/f < 4.0 \tag{3}$$

where $f_1$ is the focal length of said first lens group, and $f_{23}$ is the composite focal length of said second and third lens groups.

3. A projection lens according to claim 2, wherein the lens part disposed closest to the reduction end in said first lens group is constituted by a positive single lens having a convex surface directed onto the reduction side.

4. A projection lens according to claim 2, wherein said projection lens satisfies the following conditional expressions (4) and (5):

$$|f/IM_{12}| < 0.125 \tag{4}$$

$$1.0 < f_3/f < 3.5 \tag{5}$$

where $IM_{12}$ is the reduction-side image point position caused by said first and second lens groups, and $f_3$ is the focal length of said third lens group.

5. A projection lens according to claim 4, wherein said second lens group comprises three cemented lenses.

6. A projection lens according to claim 4, wherein said third lens group comprises, successively from the enlargement side, a positive lens having a convex surface directed onto the reduction side, and a cemented lens composed of a positive lens and a negative lens.

7. A projector apparatus comprising the projection lens according to claim 1.

* * * * *

UNITED STATES PATENT AND TRADEMARK OFFICE
CERTIFICATE OF CORRECTION

PATENT NO.   : 6,317,269 B1
DATED        : November 13, 2001
INVENTOR(S)  : Chikara Yamamoto It is certified that error appears in the above-identified patent and that said Letters Patent is hereby corrected as shown below:

Column 6,
Line 23, delete "v" and substitute therefore -- $v$ --

Column 7,
Lines 4 and 49, delete "v" and substitute therefore -- $v$ --

Signed and Sealed this

Fourth Day of June, 2002

Attest:

Attesting Officer

JAMES E. ROGAN
*Director of the United States Patent and Trademark Office*